United States Patent
Fukada et al.

(10) Patent No.: US 7,066,385 B2
(45) Date of Patent: Jun. 27, 2006

(54) INFORMATION PROCESSING TERMINAL OR CONTROL METHOD THEREFOR

(75) Inventors: Akira Fukada, Tokyo (JP); Hironobu Tamai, Chiba (JP); Shuichi Sekiya, Saitama (JP); Takuya Oshima, Tokyo (JP)

(73) Assignee: Sony Corporation (JP)

( * ) Notice: Subject to any disclaimer, the term of this patent is extended or adjusted under 35 U.S.C. 154(b) by 208 days.

(21) Appl. No.: 10/433,663

(22) PCT Filed: Oct. 10, 2002

(86) PCT No.: PCT/JP02/10544

§ 371 (c)(1),
(2), (4) Date: Jun. 6, 2003

(87) PCT Pub. No.: WO03/038740

PCT Pub. Date: May 8, 2003

(65) Prior Publication Data

US 2004/0050932 A1    Mar. 18, 2004

(30) Foreign Application Priority Data

Oct. 31, 2001   (JP)   ............ P2001-334970

(51) Int. Cl.
*G06K 5/00* (2006.01)
(52) U.S. Cl. ............................ 235/380; 235/382
(58) Field of Classification Search ............ 235/380, 235/375, 379, 381, 382, 462.46, 472, 462.45; 705/16, 17, 64
See application file for complete search history.

(56) References Cited

U.S. PATENT DOCUMENTS

| | | | |
|---|---|---|---|
| 6,386,450 B1 * | 5/2002 | Ogasawara | 235/383 |
| 6,631,840 B1 * | 10/2003 | Muramatsu et al. | 235/379 |
| 6,776,339 B1 * | 8/2004 | Piikivi | 235/451 |
| 2003/0018691 A1 * | 1/2003 | Bono et al. | 235/441 |
| 2003/0174839 A1 * | 9/2003 | Yamagata et al. | 380/270 |
| 2003/0189096 A1 * | 10/2003 | Markkanen et al. | 235/451 |

FOREIGN PATENT DOCUMENTS

| | | |
|---|---|---|
| JP | 11-272809 A1 | 10/1999 |
| JP | 2001-223631 A1 | 8/2001 |
| JP | 2001-273528 A1 | 10/2001 |
| JP | 2003-32330 A1 | 1/2003 |
| WO | WO-00/54208 A2 | 9/2000 |

OTHER PUBLICATIONS

International Search Report and Preliminary Examination Report Feb. 25, 2003.

* cited by examiner

*Primary Examiner*—Daniel St.Cyr
(74) *Attorney, Agent, or Firm*—Rader, Fisherman & Grauer PLLC; Ronald P. Kananen

(57) ABSTRACT

Amount information stored in an IC chip installed in a portable terminal has been encoded, and no key is contained in the same terminal for protection against unauthorized use. On the other hand, in order to allow the information to be viewed even offline, a portion of the information can be displayed by a specific application. After a viewer application is downloaded from a service provider, followed by mutual authentication with the IC chip, the application is enabled on the terminal, and the extent viewed is registered. Therefore, the amount information stored in the IC card or IC chip can be displayed even in an offline environment.

17 Claims, 6 Drawing Sheets

INFORMATION PROCESSING TERMINAL OR CONTROL METHOD THEREFOR

This application is a 371 of PCT/JP02/10544 filed Oct. 10, 2002.

TECHNICAL FIELD

The present invention relates to a non-contact IC card or IC chip which has a memory function for storing data and which is configured such that data can be read from and written to the memory in a non-contact manner. Particularly, the present invention relates to a non-contact (or contact) IC card or IC chip including a wireless interface for wireless data access to the memory function from an external reader/writer and a wired interface for connection with an external device and an information processing terminal such as a cellular telephone or a PDA incorporating such an IC card or IC chip when used.

More particularly, the present invention relates to an information processing terminal incorporating a non-contact (or contact) IC card or IC chip for electronically storing electronic money, electronic tickets and other amount information when used, and, particularly, an information processing terminal capable of allowing the amount information stored in the IC card or IC chip to be viewed in either an online environment or an offline environment.

BACKGROUND ART

Previously, a variety of apparatuses using a secret personal number or password for personal identity verification or authentication has been devised and put into practice. In banks or other financial institutions, for example, for using cash cards or credit cards, cash dispensers or other banking terminals prompt users to enter a secret personal number or a password for personal identity authentication, and cash cannot be deposited or withdrawn until it has been confirmed that the correct secret personal number or password was entered by the user.

A storage medium such as a magnetic strip placed on one cash card has only a single storage area for only the corresponding bank. The above-noted secret personal number or password entry merely allows access to the single storage area, and it may be insufficient for protection against forgery or theft.

For anti-forgery purposes, the cash card or credit card is often implemented as a contact IC card having an electric contact or a non-contact IC card for reading and writing data in a non-contact manner via wireless data communication. IC card readers/writers installed in, for example, cash dispensers, at the entrances of concert halls, on station ticket gates, and so on are able to access IC cards passed thereover by users in a non-contact manner.

A user enters a secret personal number to the reader of an IC card reader/writer to verify the entered secret personal number against a secret personal number stored in the IC card, thus realizing personal identity verification or authentication between the IC card and the IC card reader/writer. When personal identity verification or authentication is successfully performed, for example, an application stored in the IC card can be used. The applications stored in an IC card may include, for example, these for amount information such as electronic money and electronic ticketing. Furthermore, IC cards having prepaid vouchers electronically stored therein or portable terminals connected thereto can be used as prepaid cards. (A secret personal number for use in accessing an IC card is referred to as a PIN (Personal Identification Number).)

Recently, with the development of nanotechnology, IC cards having a relatively large capacity of storage space have become commercially available and increasingly widespread. Since a traditional cash card has only a single storage area, i.e., a single application, carried therein, it is necessary to carry a plurality of cards for various uses or applications. On the other hand, the above-noted IC card having a large capacity memory can concurrently store a plurality of applications, and, therefore, a single IC card can be used for a plurality of applications. For example, more than one application used for electronic money for electronic payment, electronic tickets for admission to designated concert halls, digital prepaid vouchers, and so on can be stored on a single IC card so as to use the single IC card in various applications.

An IC card includes not only a non-contact interface with a card reader/writer (card reading and writing apparatus) but also an external wired interface for connecting to an external device, and the IC card can be connected to or installed in an information processing terminal, such as a cellular telephone or a PDA (Personal Digital Assistant), when used. (In many cases where the IC card is installed in the terminal, the IC card is formed into one chip. The IC card and IC chip are hereinafter collectively referred to simply as an "IC card".)

In such a case, a variety of application services using the IC card can be performed on the information processing terminal. For example, a user interface, such as a keyboard or a display on the information processing terminal, can be used for user interaction with the IC card on the information processing terminal. If the IC card is connected to a cellular telephone, the content stored on the IC card can be exchanged over a telephone line.

It is to be understood that, in the case where amount information such as electronic money, electronic tickets, and prepaid vouchers is stored in the IC card, the information processing terminal can realize amount information processing, such as electronic payment and prepaid-card-based payment and various other services. The information processing terminal can also provide processing according to a data transfer phase between the IC card and a card reading and writing apparatus, or processing according to the internal state of the IC card (for example, the information stored in the IC card can be viewed on a screen of a portable terminal).

The amount information stored in an IC card or IC chip is encoded using a predetermined key for preventing unauthorized use such as copying or tampering. Since an IC chip installed in a portable terminal would be easily interfered with via an external interface, in many cases, the portable terminal has no key, and the amount information is accessed using a key only online for the purpose of offline protection against unauthorized use or key theft.

However, in such cases, disadvantageously, the amount information cannot be viewed offline at all.

DISCLOSURE OF INVENTION

It is an object of the present invention to provide a better information processing terminal and control method therefor in which a non-contact IC card or IC chip having electronic money, electronic tickets, and other amount information electronically stored therein is installed when used.

It is another object of the present invention to provide a better information processing terminal and control method therefor in which the amount information stored in the IC card or IC chip can be viewed even in an offline environment.

The present invention has been made in order to overcome the aforementioned problems, and an information processing terminal which is equipped with an IC chip containing at least one type of amount information or a control method therefor includes:

an application obtaining means or step of obtaining an application for using the amount information from a predetermined external apparatus;

a mutual authentication means or step of performing mutual authentication between the predetermined external apparatus and the IC chip; and an application registration means or step of enabling the application to be used in an area allowed for the predetermined external apparatus when the mutual authentication is successful.

The information processing terminal or control method therefor according to the present invention may further include:

an application starting means or step of starting the registered application;

a utilization extent checking means or step of checking an usable extent of the application; and an authorization means or step of authorizing use of the amount information from the IC chip to an extent usable by the application.

The application used herein has a function of visually displaying, for example, amount information stored in the IC chip. The amount information refers to, for example, electronic money, electronic tickets, and so on.

According to the information processing terminal or control method therefor of the present invention, in order to allow the amount information stored in the IC chip to be viewed even offline, a portion of the information can be displayed by a specific application. After the information processing terminal downloads a viewer application from a service provider, followed by mutual authentication with the IC chip, the application is enabled on the terminal, and the extent viewed is registered.

Since the application does not cause the amount information stored in the IC chip to be displayed without limitation, no security problem occurs. Furthermore, the application can also be downloaded with authorization using previously designated URL information and key information contained in the IC card.

Other objects, features, and advantages of the present invention will become apparent from the following more detailed description taken in conjunction with embodiments of the present invention or with reference to the accompanying drawings.

BEST MODE FOR CARRYING OUT THE INVENTION

Embodiments of the present invention are described in detail below with reference to the drawings.

The present invention pertains to use of an IC card or IC chip having amount information, such as electronic money and an electronic ticket stored therein, and, more specifically, to a system in which the IC chip is incorporated into a cellular telephone, a PDA (Personal Digital Assistant), or the like so that the amount information, such as electronic money or an electronic ticket, i.e., an application, is used.

A portable terminal with the IC chip installed therein is passed over a reader/writer (R/W), thus allowing for non-contact data communication between the installed IC chip and the reader/writer. In the non-contact data communication, the IC chip can vary the load across an antenna thereof according to a response signal to a query signal from the reader/writer, so that a signal that appears in a receiving circuit of the reader/writer is amplitude-modulated for communication.

An application, such as amount information, stored in the IC chip is encoded with a predetermined key for the purpose of protection against unauthorized use such as copy or tampering. An IC chip installed in a portable terminal would be easily interfered with via an external interface, and the portable terminal has no key for the purpose of offline protection against unauthorized use or key theft. Thus, the application cannot be used offline at all.

According to the present invention, specific amount information stored in the IC chip is not encoded with a key so that it can be viewed even offline, and a portion of the information can be viewed using an application downloaded from a service provider. However, security problems occur if such an application also allows other information to be freely viewed. Therefore, after downloading the application, followed by mutual authentication with the IC chip, the application is enabled on the terminal, and the memory area that the application can view is restricted.

Figure 1:
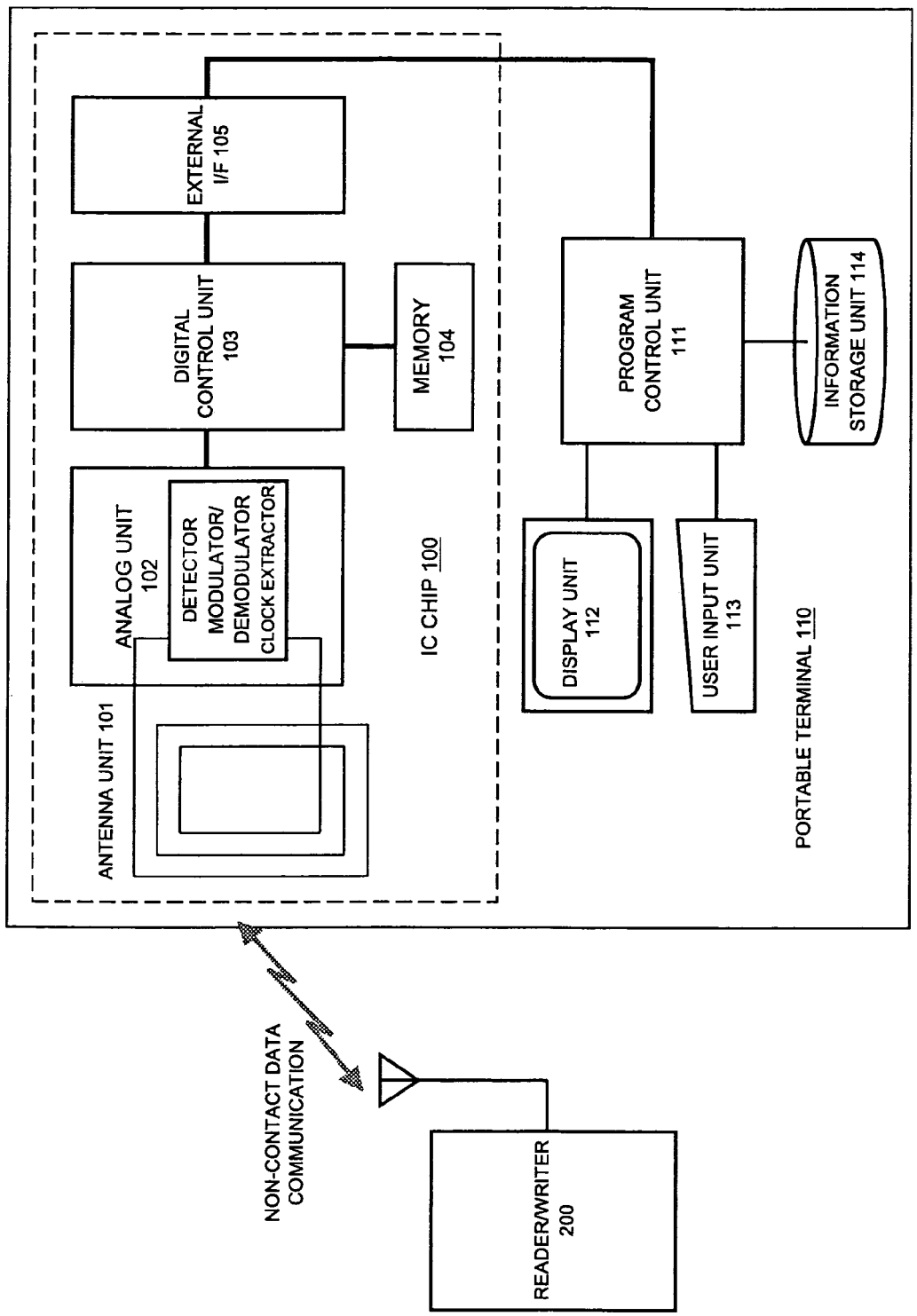
FIG. 1 is a schematic diagram showing the structure of a portable terminal 110 according to an embodiment of the present invention.

FIG. 1 schematically shows the structure of a portable terminal 110 according to an embodiment of the present invention. The portable terminal 110 corresponds to, for example, an information terminal such as a cellular telephone or a PDA. As shown in FIG. 1, the portable terminal 110 has an IC chip 100 installed therein.

As shown in FIG. 1, the IC chip 100 includes an antenna unit 101, an analog unit 102, a digital control unit 103, a memory 104, and an external interface 105.

The antenna unit 101 performs non-contact data transmission and reception to and from a reader/writer 200. The analog unit 102 performs processing on an analog signal that is transmitted or received from the antenna unit 101, such as detection, modulation/demodulation, and clock extraction.

The IC chip 100 can vary the load across the antenna thereof according to a response signal to a query signal from the reader/writer 200, so that a signal that appears in a receiving circuit of the reader/writer is amplitude-modulated for communication. The non-contact data communication scheme itself is not directly related with the scope of the present invention, and a further description thereof is not made herein.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The memory 104 of the IC chip 100 stores various applications (described below). The applications may include, for example, those for amount information, such as electronic money and electronic ticketing.

The external interface 105 is a function module for connecting the digital control unit 103 to the portable terminal 110 according to an interface protocol different from that of a non-contact interface for connecting to the reader/writer 200. The data written in the memory 104 can be transferred to the portable terminal 110 via the external interface 105.

In this embodiment, the external interface 105 which connects the portable terminal 110 to the IC chip 100 installed therein is implemented as a wired interface, such as a UART or I²C interface. The interface specification of the external interface 105 is not limited in particular, and any other wired interface or a wireless interface, such as a Bluetooth or IEEE.802.11b interface, may be used.

The IC chip 100 can be driven by, for example, a reception wave received from a card reading and writing apparatus via the antenna unit 101. It is to be understood that a part or all components of the IC chip 100 may be driven by power supplied from the portable terminal 110.

The portable terminal 110 corresponds to, for example, an information processing terminal such as a cellular telephone or a PDA (Personal Digital Assistant). The portable terminal 110 includes a program control unit 111, a display unit 112, and a user input unit 113.

The program control unit 111 includes, for example, a microprocessor, a RAM, and a ROM (these components are not shown in FIG. 1); and the microprocessor uses the RAM for a work area to execute various processing services according to a program code stored in the ROM. The processing services include the original functions of the portable terminal 110, including cellular telephone and PDA functions, and processing for the IC chip 100 (described below).

The program control unit 111 can access the IC card 100 via the external interface 105.

The program control unit 111 further includes an information storage unit 114. The information storage unit 114 is formed of, for example, a rewritable memory device such as an EEPROM (Electrically Erasable and Programmable ROM), an external storage device such as a hard disk, or the like.

In this embodiment, the information storage unit 114 stores data (described below) for managing amount information used on the memory 114 of the IC chip 100.

The display unit 112 is formed of, for example, a liquid crystal display (LCD). For example, the display unit 112 can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

The portable terminal 110 in which the IC chip 100 is installed is passed over the reader/writer (R/W) 200, thereby initiating non-contact data communication between the installed IC chip 100 and the reader/writer 200. After verification of a secret personal number, such as a PIN, the amount information stored in the IC chip 100, such as an electronic ticket or electronic money, can be accessed.

Figure 2:
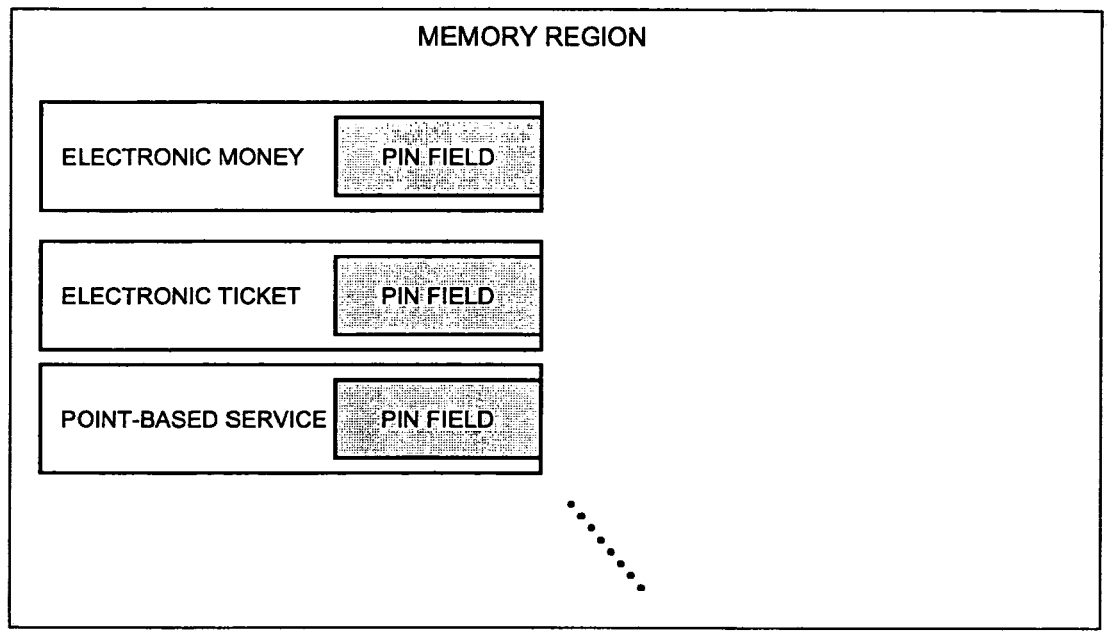
FIG. 2 is a diagram showing an example of the logical structure of a memory area of a memory 104 of an IC chip 100.

FIG. 2 shows an example of the logical structure of a memory region of the memory 104 of the IC chip 100. In the example shown in FIG. 2, various types of amount information, such as electronic money, electronic tickets, and point-based services, are stored in the memory region. Each type of amount information is addressable by the digital control unit 103. Furthermore, in the example shown in FIG. 2, each type of amount information is provided with a PIN field in which a secret personal number or a PIN is stored, and the amount information can be accessed for use only when verification based on the secret personal number is successful.

The memory area of the memory 104 of the IC chip 100 is used as, physically, "service code" minimum units. Areas formed of consecutive service codes are allocated to each service provider (business entity), and each service provider can assign, in the areas allocated thereto, service codes used for a service (application) provided thereby.

The information storage unit 114 of the portable terminal 110 uses an area information table and an application management table to manage the use status of the memory area of the IC chip 100. The area information table is used to manage which area is allocated to which service provider, and the application management table is used to manage which service code of the area is assigned to which application.

Table 1 shows an example structure of the area information table. In the example shown in Table 1, service codes 1 through 20 are allocated to business entity A, and the subsequent service codes 21 through 30 are allocated to business entity B.

TABLE 1

| Name of Business Entity | Start Service Code | End Service Code |
|---|---|---|
| A | 1 | 20 |
| B | 21 | 30 |

Table 2 shows an example structure of the application management table. In the example shown in Table 2, service codes 2 through 10 (in the areas 1 to 20 allocated to the business entity A) are assigned to an electronic ticket (provided by the business entity A), and service codes 21 through 25 (in the areas 21 to 30 allocated to the business entity B) are assigned to electronic money (provided by the business entity B).

TABLE 2

| Application Name | Start Service Code | End Service Code |
|---|---|---|
| electronic ticket | 2 | 10 |
| electronic money | 21 | 25 |

Figure 3:
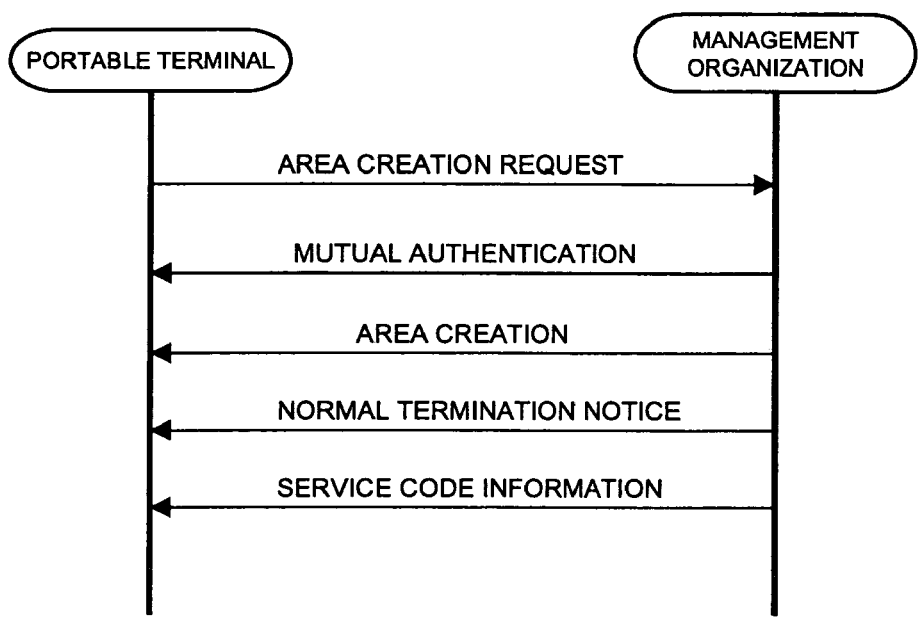
FIG. 3 is a sequence chart showing a processing routine for the portable terminal 110 with the IC chip 100 installed therein to create an area on the memory 104.

FIG. 3 shows a processing routine for the portable terminal 110 with the IC chip 100 installed therein to create an area on the memory 104. The area creation process starts with a request from the portable terminal 110 to a predetermined management organization. When the portable terminal 110 issues an area creation request to the management organization, an area is created in the memory 104 after performing mutual authentication between the portable terminal 110 and the management organization. Then, a normal termination notice and service code information are sent from the management organization to the portable terminal 110. Based on the service code information, the portable terminal 110 registers a new entry in the area information table.

Figure 4:
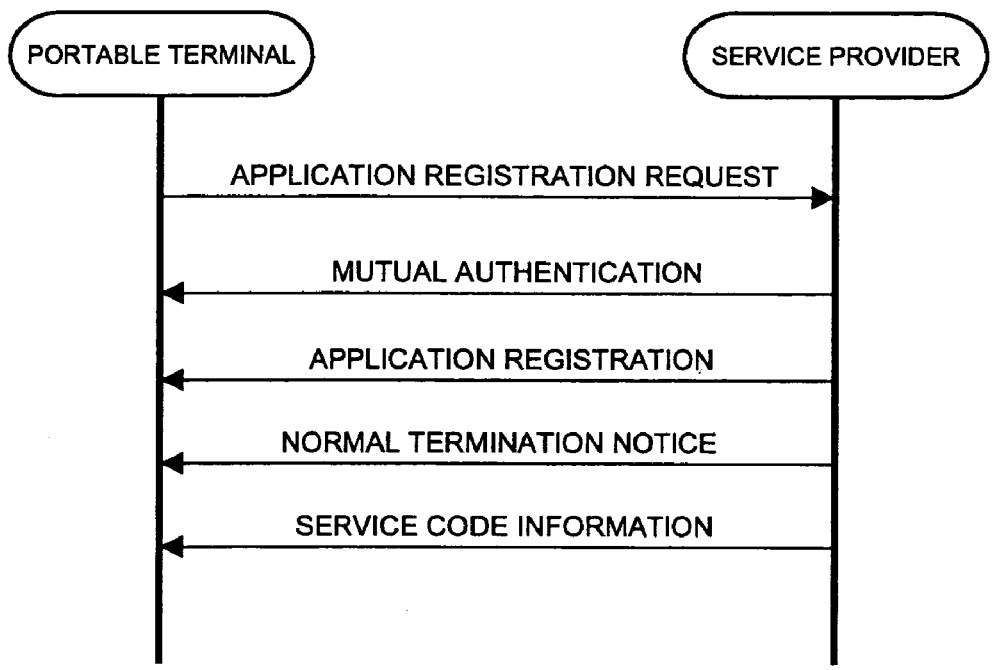
FIG. 4 is a sequence chart showing a processing routine for the portable terminal 110 with the IC chip 100 installed therein to register an application in the memory 104.

FIG. 4 shows a processing routine for the portable terminal 110 with the IC chip 100 installed therein to register an application in the memory 104.

The application registration process starts with a request from the portable terminal 110 to a service provider for providing an electronic money application or the like. When the portable terminal 110 issues an application registration request to the corresponding service provider, the electronic money application or the like is registered in the memory 104 after performing mutual authentication between the portable terminal 110 and the service provider.

Then, a normal terminal notice and service code information are sent from the service provider to the portable terminal 110. Based on the service code information, the portable terminal 110 registers a new entry in the application management table.

The portable terminal 110 has no key for offline protection against unauthorized use of the amount information stored in the IC chip 100 or key theft. Thus, the application cannot be used offline at all (described above).

In this embodiment, on the other hand, in order to allow specific amount information stored in the IC chip 100 to be viewed even offline, a portion of the information in the memory 104 can be viewed using an application downloaded from a service provider to the portable terminal 110. However, security problems occur if this application also allows other information to be freely viewed. Therefore, after downloading the application, followed by mutual authentication with the IC chip, the application is enabled on the terminal, and the memory area, which the application can view, is restricted.

Figure 5:
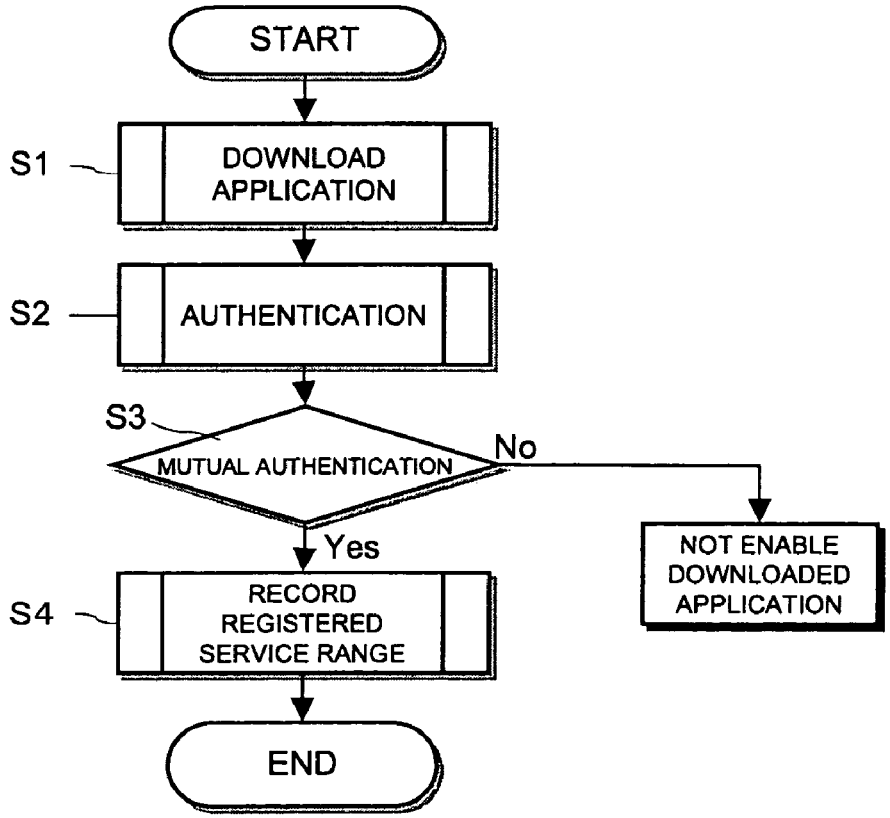
FIG. 5 is a flowchart showing a processing routine for registering an application, which is downloaded from a service provider, in the portable terminal 110.
Figure 6:
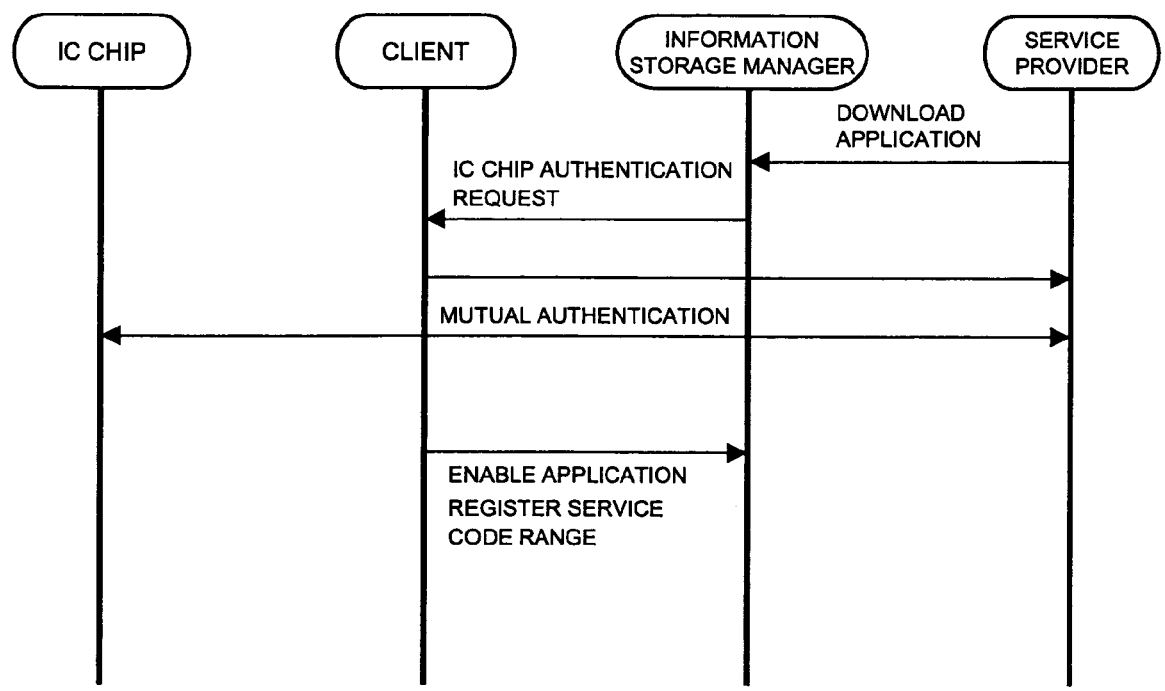
FIG. 6 is a sequence chart showing the actions among the portable terminal 110, the service provider, and the IC chip 100 for registering the application downloaded from the service provider in the portable terminal 110.

FIG. 5 is a flowchart of a processing routine for registering an application downloaded from a service provider to the portable terminal 110. FIG. 6 shows the actions among the portable terminal 110, the service provider, and the IC chip 100 for registering the application downloaded from the service provider in the portable terminal 110. It is assumed that an information storage manager for storing the application downloaded from the service provider and a module called a client for handling communication between the IC chip 100 and the service provider are initiated in the program control unit 111 of the portable terminal 110. The application registration process is described below with reference to FIGS. 5 and 6.

First, the information storage manager downloads an application such as an offline viewer from a service provider (step S1). The offline viewer is an application which allows the information stored in the memory 104 of the IC chip 100 to be viewed or displayed on a screen.

Then, the information storage manager requests the client to authenticate the downloaded application (step S2).

In response, the client performs mutual authentication with the service provider based on URL information of the IC chip and the download site or the like (step S3). The authentication is performed based on, for example, whether or not the service provider has the same key as the IC chip 100. If the authentication is not successful, the downloaded application is not enabled.

If the authentication is successful, the client enables the downloaded application and records the registered service range, which is previously designated to the service provider, in an extension region of the information storage manager to which the application is downloaded (step S4). The client refers to the area information table (see Table 1) or the application registration table (see Table 2) to determine the registered service range of the downloaded application.

Figure 7:
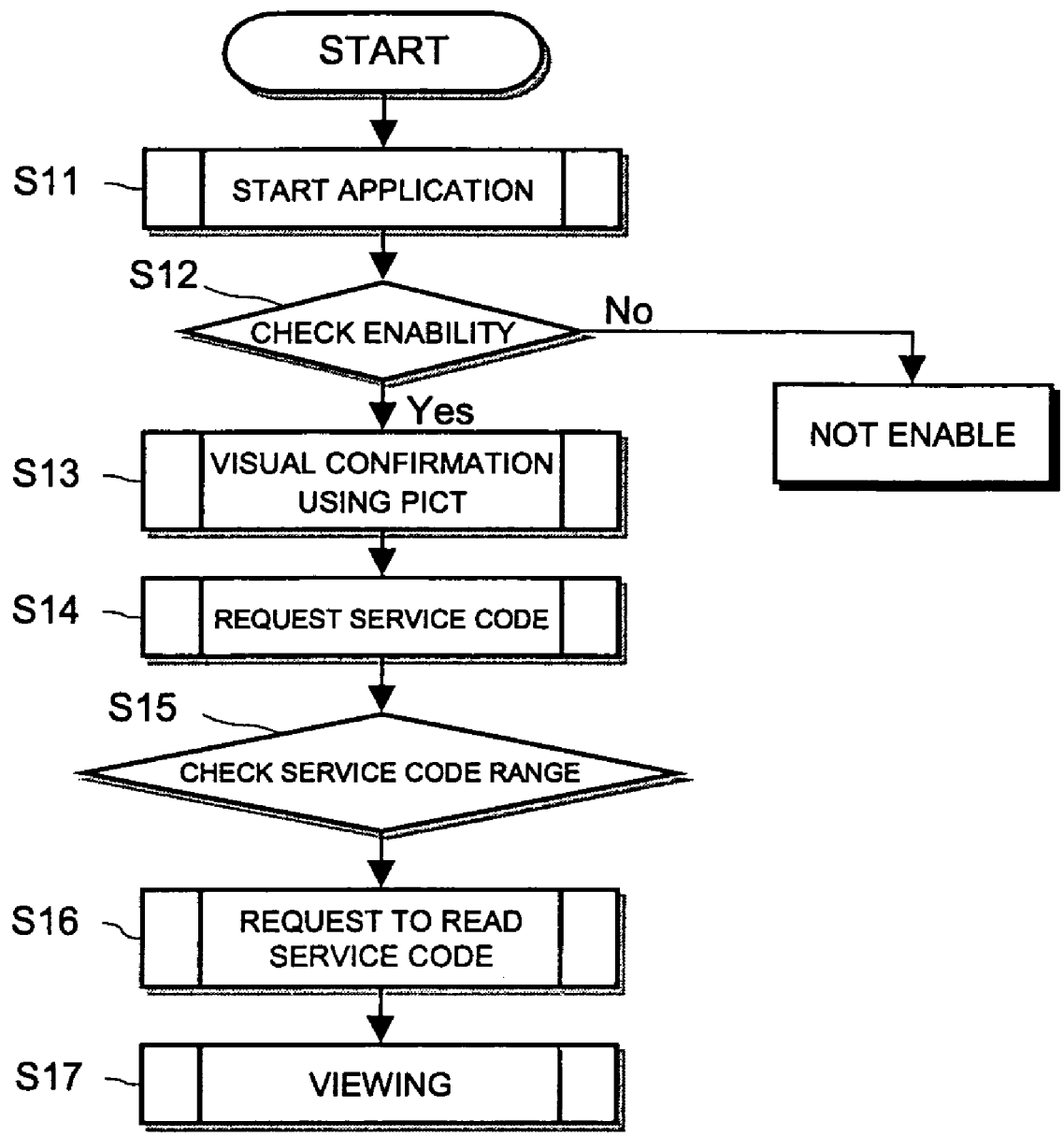
FIG. 7 is a flowchart showing a processing routine for starting the application downloaded from the service provider on the portable terminal 110.
Figure 8:
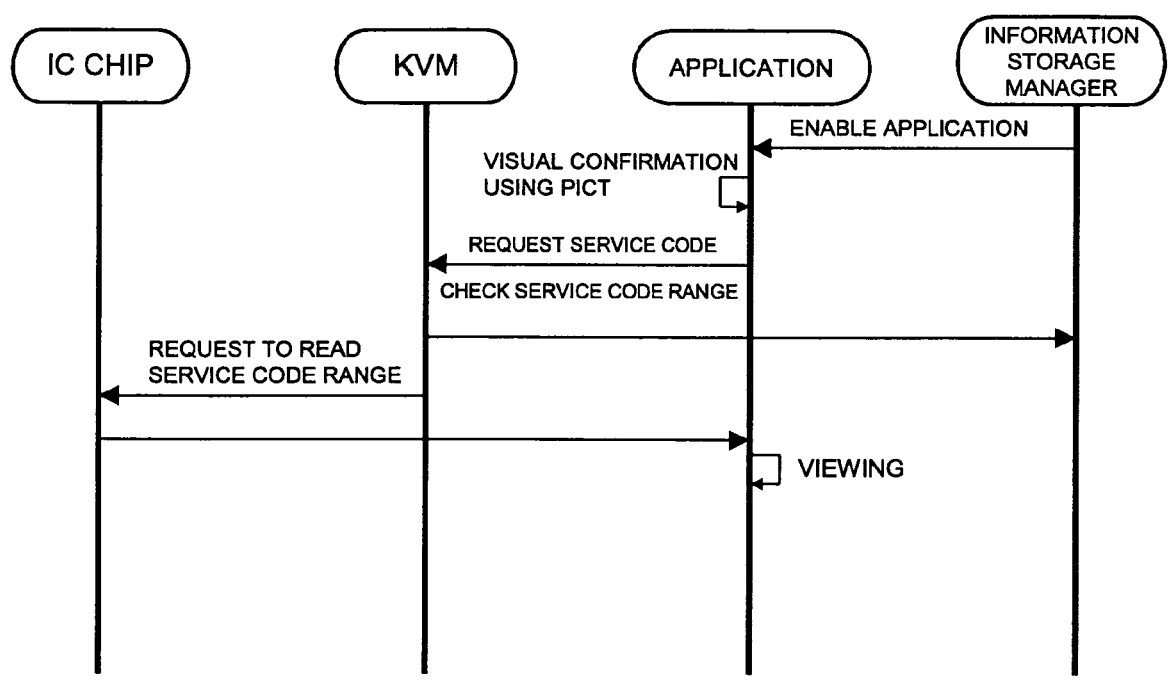
FIG. 8 is a sequence chart showing the actions between the portable terminal 110 and the IC chip for executing the application.

FIG. 7 is a flowchart of a processing routine for starting an application downloaded from a service provider on the portable terminal 110. FIG. 8 shows the actions between the portable terminal 110 and the IC chip for executing the application. It is noted that the portable terminal 110 has an application execution environment named KVM (K Virtual Machine). (K Virtual Machine is the infrastructure of Java 2 Platform Micro Edition for use in devices such as cellular telephones, pagers, and hand-held POS systems.) A process for starting the application downloaded from the service provider on the portable terminal 110 is described below with reference to FIGS. 7 and 8.

When a user starts the application using a user interface such as the display unit 112 or the user input unit 113 of the portable terminal 110 (step S11), the information storage manager checks the enability of the application (step S12).

If the enability check is not successful, the application is not enabled, and the processing routine terminates. If the enability check is successful, the user makes visual confirmation using security PICT or the like (step S13). Then, the application requests a device API (Application Programming Interface) or the like to read a designated service code to the information storage manager (step S14).

In response, the device API checks the service code range in the extension region of the information storage manager and returns the result to the application (step S15).

Then, the application specifies the service code range as an argument and makes the read request to the KVM (step S16). The KVM reads the information of the designated service code range while maintaining high security, and passes it to the application.

The application receives the information of the service code range that it qualifies via the KVM to allow the information to be displayed on the screen of the display unit 112 (step S17).

According to this embodiment, the downloaded application cannot be registered or enabled until authentication between the service provider and the IC card has been successfully performed, thus preventing the offline viewer from being downloaded from a spoof site.

According to this embodiment, furthermore, applications service limits are registered, thus preventing a legally downloaded offline viewer from accessing the service range of other business entities without authorization.

According to this embodiment, furthermore, execution of authorized offline viewers can be identified.

Appendix

The present invention has been described in detail with reference to specific examples. However, it is obvious that modifications or replacements may be made to the embodiment by those skilled in the art without departing from the spirit and scope of the present invention. The present invention has been disclosed in an exemplary form, and this form should not be construed as the restricted one. Reference should be made to the claims for delineation of the scope of the present invention.

INDUSTRIAL APPLICABILITY

According to the present invention, there can be provided a better information processing terminal and control method therefor in which a non-contact IC card or IC chip having electronic money, electronic tickets, and other amount information electronically stored therein is installed when used.

According to the present invention, furthermore, there can be provided a better information processing terminal and control method therefor in which the amount information stored in the IC card or IC chip can be viewed even in an offline environment.

According to the present invention, in order to allow amount information stored in an IC chip to be viewed even offline, the information processing terminal can be configured such that a portion of the information can be displayed by a specific application. After the information processing terminal downloads a viewer application from a service provider, followed by mutual authentication with the IC chip, the application is enabled on the terminal, and the extent viewed is registered. Since the application does not cause the amount information stored in the IC chip to be displayed without limitation, no security problem occurs.

The invention claimed is:

1. An information processing terminal which is equipped with an IC chip that stores service information in area units such that each area unit has an associated service code, said information processing terminal comprising:
    application obtaining means for obtaining an application from a predetermined external apparatus, wherein the application enables access to the service information by communicating with associated service providers;
    mutual authentication means for performing mutual authentication between the predetermined external apparatus and the IC chip; and
    application registration means for enabling the application to be used in an area of memory allocated to the predetermined external apparatus when the mutual authentication is successful by registering the service code associated with the allocated area of memory to the associated service provider in an area information table.

2. The information processing terminal according to claim 1, further comprising:
    application starting means for starting the registered application;
    utilization extent checking means for checking an usable extent of the application; and
    authorization means for authorizing use of the service information from the IC chip to an extent usable by the application.

3. The information processing terminal according to claim 1, further comprising display means for displaying information, wherein the application allows the service information stored in the IC chip to be visually displayed.

4. The information processing terminal according to claim 1, wherein the service information comprises electronic money or an electronic ticket.

5. A control method for an information processing terminal which is equipped with an IC chip that stores service information in area units such that each area unit has an associated service code, the method comprising:
    an application obtaining step of obtaining an application from a predetermined external apparatus, wherein the application enables access to the service information by communicating with associated service providers;
    a mutual authentication step of performing mutual authentication between the predetermined external apparatus and the IC chip; and
    an application registration step of enabling the application to be used in an area of memory allocated to the predetermined external apparatus when the mutual authentication is successful by registering the service code associated with the allocated area of memory to the associated service provider in an area information table.

6. The control method according to claim 5, further comprising:
    an application starting step of starting the registered application;
    a utilization area checking step of checking an usable extent of the application; and
    an authorization step of authorizing use of the service information from the IC chip to an extent usable by the application.

7. The control method according to claim 5, wherein the application allows the service information stored in the IC chip to be visually displayed.

8. An information processing terminal, comprising:
    an IC chip having memory, wherein said memory stores service information that is used by one of a plurality of service providers to provide a service, said service information is stored in area units and each area unit which has a service code;
    area information registration means for registering service code allocated to each service provider in an area information table, said service code being registered by communication with an apparatus of a management organization;
    application obtaining means for obtaining an application that enables access to the service information by communicating with a respective service provider of the plurality of service providers;
    application registration means for registering the service code allocated to the application stored in the memory in an application management table by communicating with the respective service provider of the plurality of service providers;
    enable means for enabling activation of the obtained application, wherein said enable means determines the service code to be used for the application in the memory based on the area information table and the application management table after performing a mutual authentication between the IC chip and the respective service provider when the enable means is in an off-line state with the service provider.

9. The information processing terminal according to claim 8, further comprising:
    reading means for reading information from the memory while retaining security, said reading means checks a service registration range relating to the service code allocated to the corresponding application and transfer data corresponding to the service registration range stored in the memory when a request to read from the application activated in the off-line state with the service provider is received.

10. The information processing terminal according to claim 8, further comprising:
a display for displaying information, wherein a portion of the application activated in off-line state is an off-line viewer that displays the information read from the memory.

11. The information processing terminal according to claim 8, wherein said applications include at least one of electronic money and electronic ticketing.

12. An information processing method of an information processing terminal equipped with an IC chip, the method comprising the steps of:
storing, in memory of the IC chip, service information in area units such that each area unit has an associated service code;
accessing service information by communicating with associated service providers;
obtaining an application from a predetermined external apparatus based on the service information;
performing mutual authentication between the predetermined external apparatus and the IC chip of the information processing terminal;
allocating an area of memory with to a predetermined service provider
registering the service code associated with the allocated area of memory to the predetermined service provider in an area information table; and
enabling the application to be used in the allocated area of memory when the mutual authentication is successful.

13. The method according to claim 12, further comprising the step of:
starting the application;
checking a usable extent of the application; and
authorizing use of the service information from the IC chip based on the extent usable by the application.

14. The method according to claim 12, further comprising the step of:
displaying the service information stored in the IC chip.

15. An information processing method of an information processing terminal equipped with an IC chip, the method comprising the steps of:
storing, in memory of the IC chip, service information of a plurality of service providers in area units such that each area unit has an associated service code;
allocating a service code to each of the plurality of service providers;
registering the service code allocated to each service provider in an area information table by communicating with an apparatus of a management organization;
obtaining a corresponding application that enables access to the service information by communicating with the service providers based on the registered service code;
registering the service code allocated to the corresponding application stored in the memory in an application management table by communicating with respective service providers of the plurality of service providers; and
enabling activation of the corresponding application by performing a mutual authentication between the IC chip and the respective service providers and determining the service code to be used for the corresponding application in the memory based on the area information table and the application management table, wherein the corresponding application is activated when the information processing terminal is in an off-line state with the respective service provider.

16. The method of claim 15, further comprising the step of:
reading information from the memory while retaining security by checking a service registration range relating to the service code allocated to the corresponding application and transfer data corresponding to the service registration range stored in the memory when a request to read from the corresponding application activated in the off-line state with the service provider is received.

17. The method of claim 15, further comprising the step of:
displaying the information read from memory.

* * * * *

UNITED STATES PATENT AND TRADEMARK OFFICE
CERTIFICATE OF CORRECTION

PATENT NO. : 7,066,385 B2  Page 1 of 1
APPLICATION NO. : 10/433663
DATED : June 27, 2006
INVENTOR(S) : Akira Fukada et al.

It is certified that error appears in the above-identified patent and that said Letters Patent is hereby corrected as shown below:

Column 11:
Line 29, "memory with to a predetermined" should read -- of memory to a predetermined --.

Line 30, "provider" should read -- provider; --.

Signed and Sealed this

Fifth Day of June, 2007

JON W. DUDAS
*Director of the United States Patent and Trademark Office*